Sept. 8, 1970  R. C. EMMETT, JR., ET AL  3,527,573
WASHING APPARATUS FOR FINELY DIVIDED MATERIALS
Filed Feb. 1, 1967  4 Sheets-Sheet 2

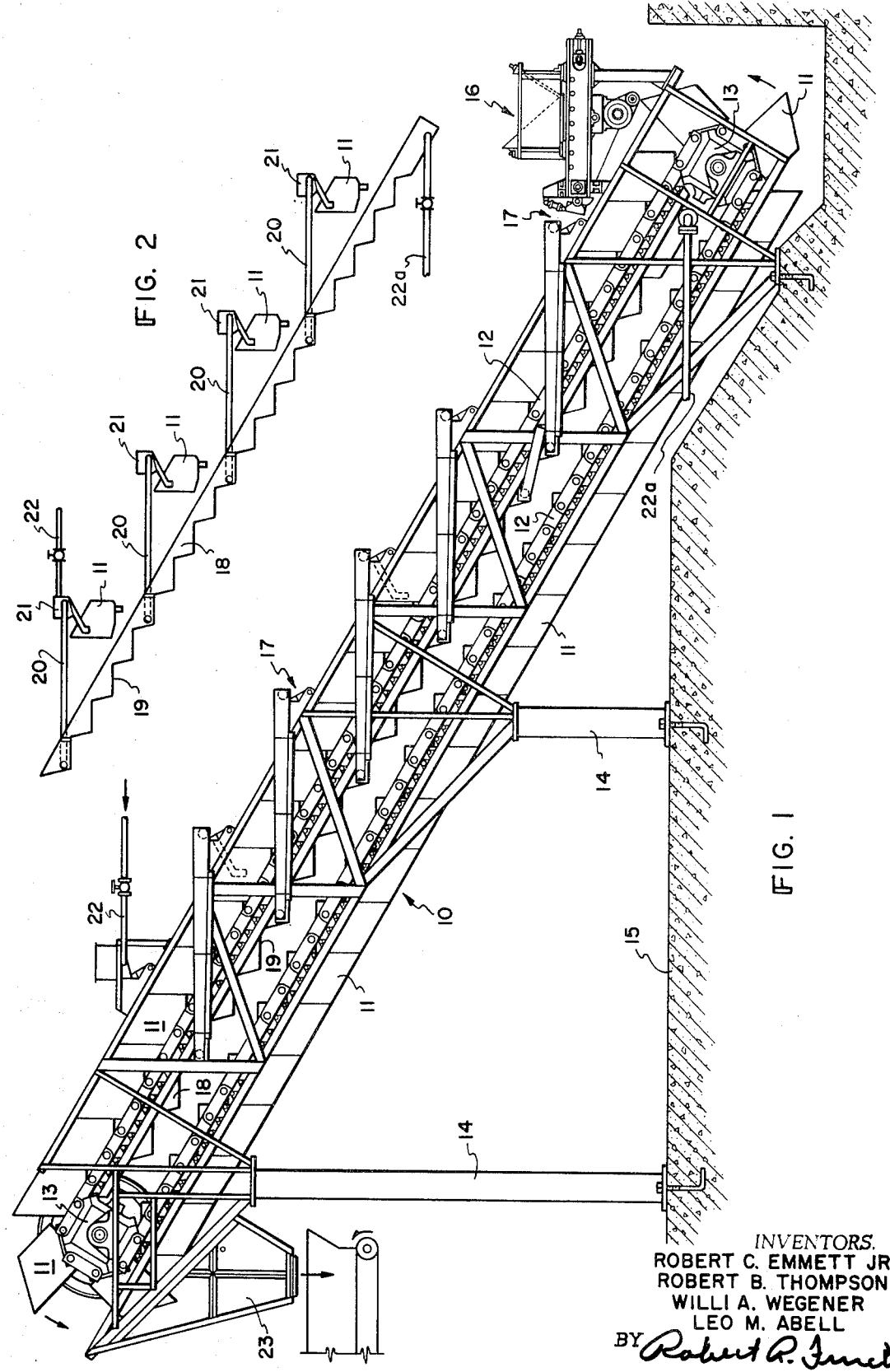

INVENTORS.
ROBERT C. EMMETT JR.
ROBERT B. THOMPSON
WILLI A. WEGENER
LEO M. ABELL
BY Robert R. Finch
ATTORNEY Sept. 8, 1970  R. C. EMMETT, JR., ET AL  3,527,573
WASHING APPARATUS FOR FINELY DIVIDED MATERIALS
Filed Feb. 1, 1967  4 Sheets-Sheet 3

INVENTORS.
ROBERT C. EMMETT JR.
ROBERT B. THOMPSON
WILLI A. WEGENER
LEO M. ABELL

BY *Robert A. Finch*
ATTORNEY

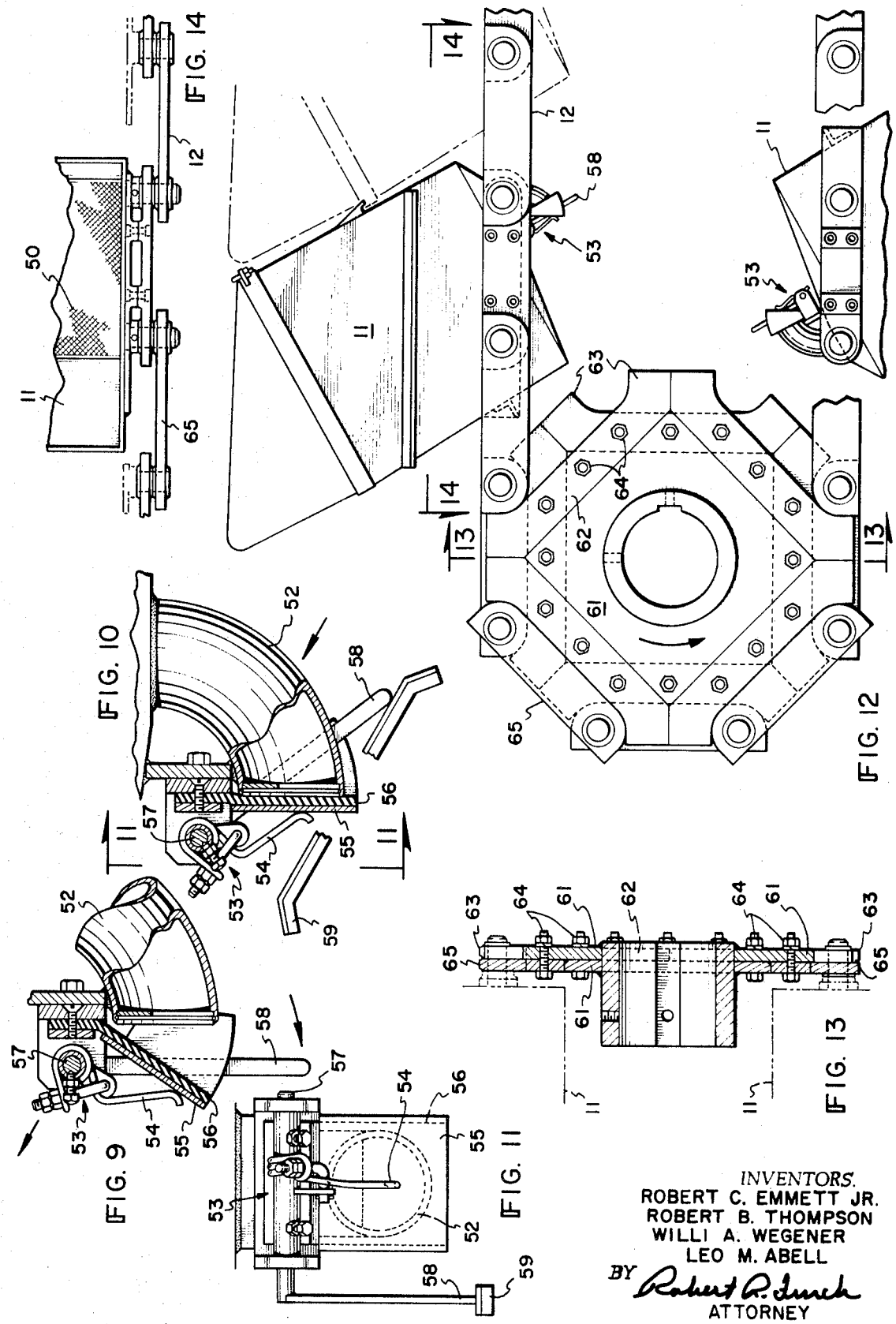

United States Patent Office 3,527,573
Patented Sept. 8, 1970

3,527,573
WASHING APPARATUS FOR FINELY
DIVIDED MATERIALS
Robert C. Emmett, Jr., East Dundee, Ill., Robert B.
Thompson and Willi A. Wegener, Salt Lake City, Utah,
and Leo M. Abell, Morenci, Ariz., assignors to Envirotech Corporation, Salt Lake City, Utah, a corporation of Delaware
Filed Feb. 1, 1967, Ser. No. 613,147
Int. Cl. B01d 11/02
U.S. Cl. 23—270        6 Claims

ABSTRACT OF THE DISCLOSURE

Apparatus for counter-current wash of particulate solids including a plurality of false bottomed pans arranged as an upwardly inclined endless conveyor. Pan movement actuates a feed distributor to fill successive pans with a level bed of solids. Each pan passes successively through a plurality of wash-drain stages. At each stage a wash distributor controlled by pan movement applies liquid to the surface of the bed of solids in the pans. Pan movement also controls a drainage valve on each pan and the controls are arranged so that at each stage the solids are submerged before draining. Liquid drained from the pans gravity flows through a launder system to the next lower stage. The sprocket driving the pans is formed from a series of flat plates.

---

This invention relates to counter-current wash apparatus for treating particulate solids.

The invention has particular application in a recently developed technique for the recovery of metal values from slime-bearing ores such as copper oxides where the ore is moistened with an aqueous solution of leach solvent for copper salts that also provides sufficient moisture to agglomerate the ore particles and bind up the slimes. Soluble salts are then recovered without slime release by subjecting the agglomerated ore to repeated steps of quiescent submergence in wash fluid followed by gravity drainage.

It is the primary object of this invention to provide apparatus for the counter-current stagewise washing of particulate solids under substantially quiescent conditions whereby diffusion of soluble salts into the wash liquor may be effected and slime release avoided.

Another object is to provide apparatus that will convey and elevate solids simultaneously with washing thereof.

A specific object is to provide a feeder for introducing particulate solids into a wash pan or other vessel to form therein a uniform depth bed of solids.

A further object is to provide means for the gentle supply of wash water onto the bed of solids and for draining the liquor therefrom in so-called plug or displacement flow whereby the solids are soaked without agitation and slimes release; and, undesirable channel flow is avoided.

Still another object is the provision of wash apparatus of the type described comprising a plurality of wash pans connected together on an endless chain and driven by a specially constructed sprocket that is low in initial cost and is of such construction that its teeth are readily replaceable.

Broadly stated, the invention comprises a plurality of wash pans having valved bottom drainage outlets, an endless sprocket-driven chain connecting the pans together for continuous movement up an inclined frame, feed means at the bottom of the frame for filling the pans with particulate solids, applicator means for supplying wash liquor gently onto the surface of solids in the pans to gravity flow successively through said pans counter-currently to movement of the pans, and separate actuator means for both the wash applicator and pan outlet valves to effect intermittent operation of the former to supply wash liquor to successive pans along with opening and closing of the latter to limit drainage from pans while wash liquor is supplied thereto, thereby to effect complete immersion of solids in wash liquor and subsequent drainage of liquor from the solids.

The invention will be more fully understood by referring to the accompanying drawings which illustrate a preferred embodiment thereof.

In the drawings:

FIG. 1 is a side elevational view of a traveling pan washer embodying the invention.

FIG. 2 is an abbreviated schematic view of the wash liquor flow system of the invention.

FIGS. 9 and 10 are enlarged fragmentary views, partly in section, of the preferred valve means in the bottom of each pan showing the valve in the open and closed positions respectively.

FIG. 11 is an end view of the valve shown in FIGS. 9 and 10, taken along line 11—11 of FIG. 10 looking in the direction of the arrows.

FIG. 12 is a side elevational view of the sprocket of the invention shown in operative relationship with a chain.

FIG. 13 is a sectional view taken along line 13—13 of FIG. 12.

FIG. 14 is a partial top plan view taken as looking in the direction of the arrows on line 14—14 of FIG. 12.

Figure 3:
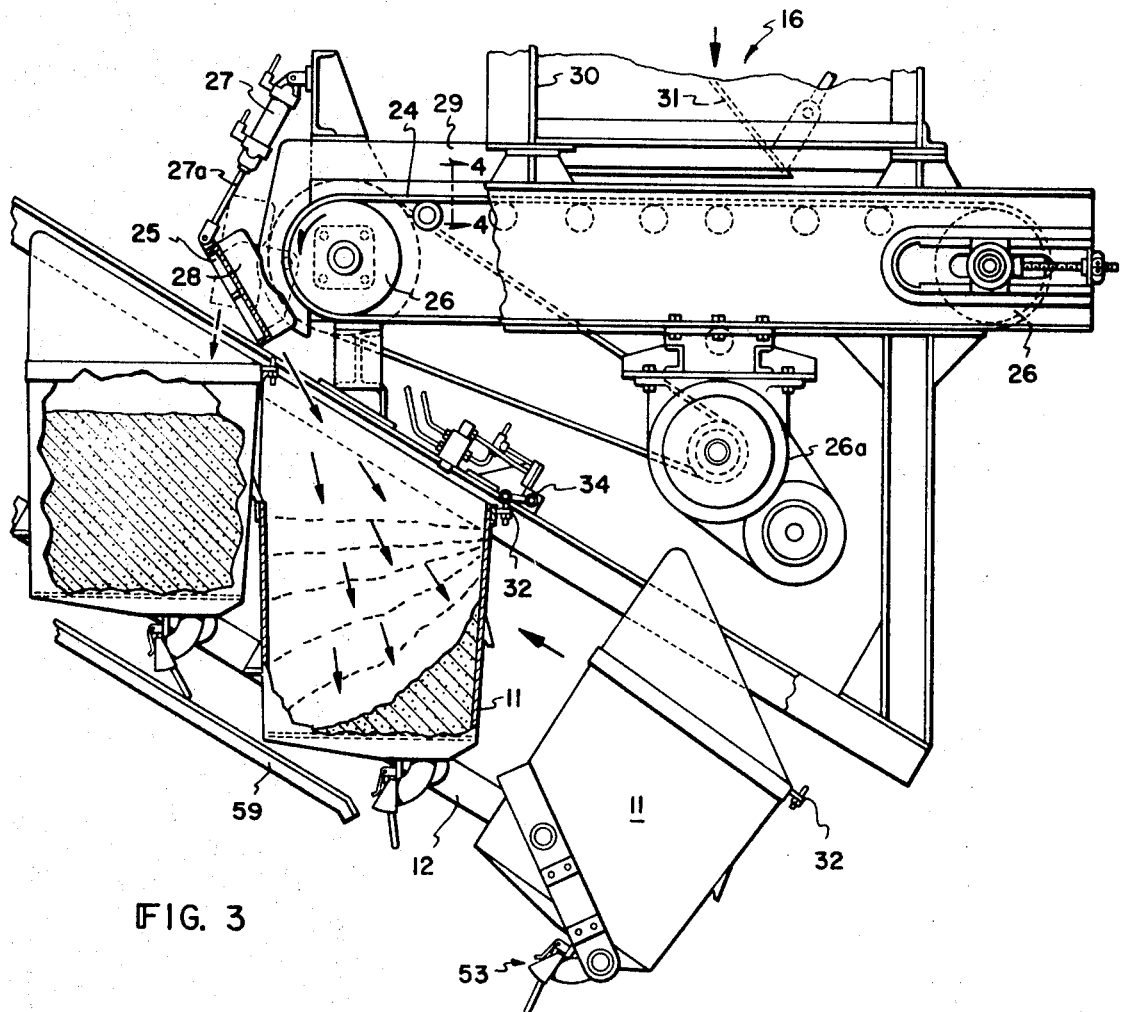
FIG. 3 is an enlarged side elevational view, with parts broken away for convenience of illustration, of a preferred embodiment of the solids feeding device of the invention.

Referring now to the drawings, the washer 10 comprises a plurality of pans 11 evenly spaced on a drive chain 12 trained around sprockets 13 mounted at opposite ends of the washer. The sprockets are driven by any suitable means such as a variable speed drive (not shown) located at the upper end. A suitable structure, such as posts 14 resting on any floor 15, supports the washer.

A feeder 16 located above the pans at the lower end of the unit fills each pan to an even depth of ore solids as the pans move thereunder.

The filled pans move up the incline to pass successively under a plurality of wash liquor applicators 17 whereby the pans are repeatedly filled with liquor and drained. After each filling, the wash liquor is retained in the pan long enough to soak the material to effect diffusion of soluble salts into the liquor. As best shown in FIGS. 1 and 2, liquor draining from a pan flows down a launder 18, over steps 19, into a lower channel 20 which carries it to the next lower wash liquor reservoir 21 for introduction into a lower pan.

Fresh wash liquor is introduced via conduit 22 to the uppermost wash reservoir and spent wash liquor containing dissolved product salts drains from the bottom pan to be discharged through conduit 22a to further processing.

The number of wash liquor applicators can vary for any installation. Thus, although the illustrated embodiment employs six applicators on a 30° incline conveyor, either more or fewer devices could be used and the incline can be made steeper or shallower. The speed of the conveyor can also be varied to achieve maximum wash efficiencies for any given material.

At the top of the conveyor, the washed material is dumped from the pans into a bin 23 whence it passes to further processing. It will be readily apparent that the pan washer has a secondary advantage in that it elevates and conveys materials at the same time they are being washed.

A particular feeder 16, illustrated in detail in FIG. 3, is provided to effect even filling of the pans with finely divided ore. The feeder includes a conveyor belt 24 trained around pulleys 26 of which the forward one is belt driven from a suitable drive 26a. A deflection blade 25 is located adjacent the discharge end of the conveyor. The blade is connected to the piston arm 27a of a double acting piston-cylinder 27 and has end plates 28 by which it is pivotally mounted to the conveyor framework. The piston 27 is automatically actuated in response to movement of the pans into loading position under the feeder. As the pans move, the deflector blade is rotated upwardly out of the way so that material falls freely into the interior of the pans. As the trailing or rear side of a pan approaches the feed stream, the deflector rotates downwardly to intercept the feed stream, and deflect it into the next succeeding pan where it falls initially into the rear portion thereof, then, when the front edge of the pan has advanced to a position under the discharge end of the conveyor, the deflector swings out of the way so that material again drops freely into the pan. In this manner an even fore and aft deposition of materials is insured.

Figure 4:
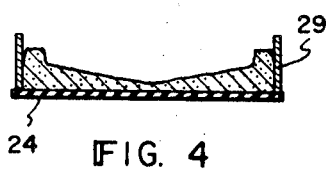
FIG. 4 is a sectional view taken in the plane of line 4—4 of FIG. 3.

To provide uniform side to side material deposition in the pans the width of the feed stream is limited by sideboards 29 to be less than the width of the pans and the material between the sideboards is engaged by a spreader 31 which forms it as a trough or concave shape between the sideboards with extra material along the edges (FIG. 4). Since the feed stream is narrower than the pans, the excess material will fan outwardly toward the pan sidewalls as well as inwardly toward the concave center. The result is uniform side to side deposition of feed solids.

Figure 5:
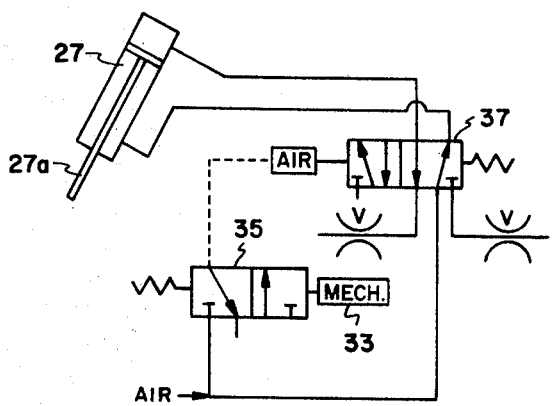
FIG. 5 is a schematic diagram of an automatic control system for the solids feeding device.

Automatic regulation of the deflector blade position is effected by a control system, illustrated schematically in FIG. 5, in which the deflector is positioned in response to position of the approaching pan. Briefly, the system comprises a spring return pilot valve 35 movable against the spring by a mechanical switch 33; and a pilot operated valve 37 by which air is directed to the proper side of the double acting piston 27 to effect rotation of the deflector. In its normal position, as illustrated in FIG. 5, the piston is in the retracted position in which the deflector is rotated out of the feed stream and material is falling freely into the pan. As a succeeding pan aproaches the loading position a finger 32 (FIG. 3) engages the switch 33 on the pilot valve and moves the latter to the reverse position which directs air to the left end of the pilot operated valve 37 thereby shifting it to the right to direct air to the other side of the piston, extending arm 27a and thus rotating the deflector 25 to the position shown with solid lines in FIG. 3, whereby feed is directed to the approaching pan. As the pans move further, the finger 32 disengages from the switch 33 whereupon the pilot valve and the entire system returns to the condition illustrated in FIG. 4 and the deflector is rotated to the dotted line position shown in FIG. 3.

Figure 7:
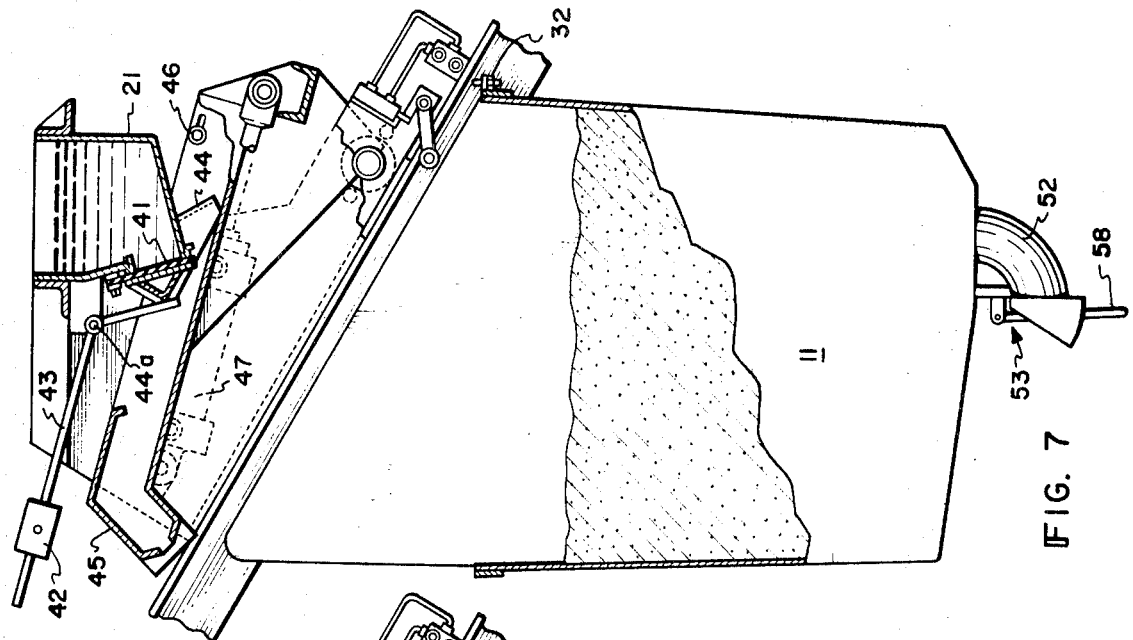
FIG. 7 is a view similar to FIG. 6 except that the wash liquor applicator is inoperative.
Figure 6:
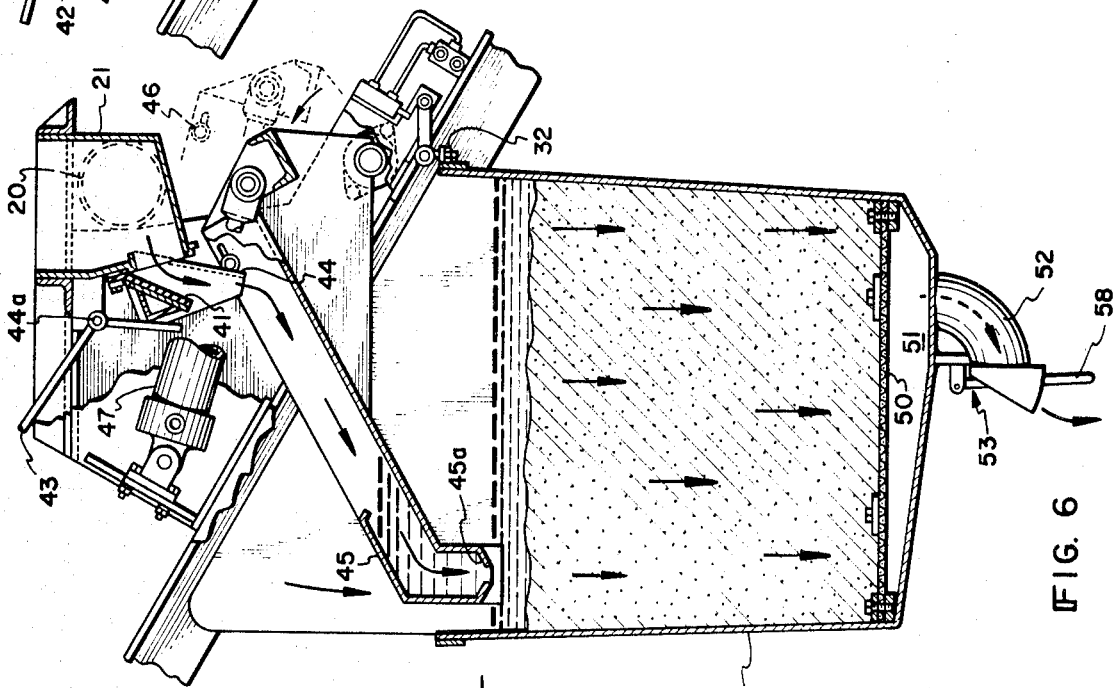
FIG. 6 is a side sectional view of a filled pan receiving wash liquor.

When the wash fluid applicators shown in FIGS. 6 and 7 are actuated, the fluid in reservoir 21 gravity flows through a valve 41, fluid guide 44, spout 45 and out through constriction 45a to be gently deposited on the surface of the material in the pans. Counter-weight 42 acts on lever 43 which is pivoted at point 44a to maintain the valve closed when the applicator is inoperative with the reservoir full. When the applicator is operative, piston 47 is actuated to lower the spout to a position just above the surface level in the pans. As the spout drops, projection 46 moves fluid guide 44 thereby opening valve 41.

Figure 8:
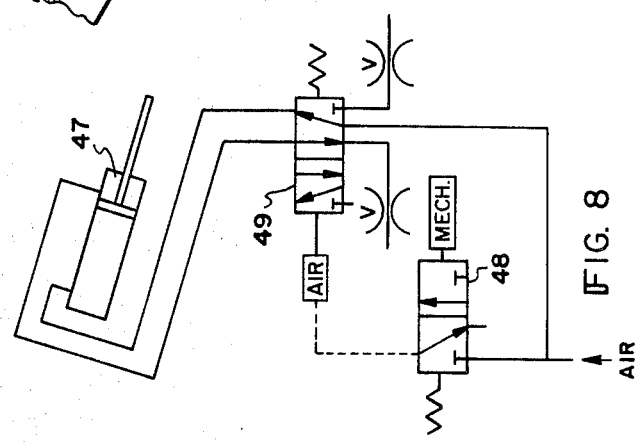
FIG. 8 is a schematic diagram of an automatic control system for the wash fluid applicator.

The piston 47 is actuated by a control system, as shown in FIG. 8, wherein pilot valve 48 operates three-way valve 49 which in turn controls the movement of the piston. As a pan moves up the incline and under a wash fluid applicator, finger 32 engages the switch on the pilot valve and moves the latter to the position shown schematically in the right hand position of the valve diagram. Air will then be directed to the actuator on the left hand side of the pilot-actuated valve, shifting it to the right to supply air to the right hand side of double-acting piston 47. When the finger 32 disengages the pilot valve switch, spring return means on both the pilot valve and the pilot actuated valve return them to the positions shown in FIG. 8. In this position air is applied to the left hand side of piston 47 in a manner to slowly extend the piston rod and thus gradually raise spout 45 as the pan ascends the incline.

The material in the pans is supported by a foraminous false bottom 50 (FIG. 6) so that wash liquor discharges uniformly from the entire bottom of the bed of solids into an underlying chamber 51 thence out a valved pipe 52 which is normally open to flow but is closed during some of the filling operations by a valve cover 53 formed from a flexible flap 56 and a stiffener 55. As best shown in FIGS. 9 and 10, closure is effected by a spring 54 contacting the stiffening plate 55. The spring is coiled around a shaft 57 to which is secured a lever type cam follower 58. As the pans move, the lever 58 engages a cam 59 on the frame to effect opening and closing of the drain pipe 52 in response to the position of the pans. When the lever is off the cam no spring pressure is applied to the cover and the pipe is open to flow. By adjusting the relative positions of the lever and cam or the spring itself the closing force may be varied.

A feature of the invention resides in a specific construction of the sprocket to reduce initial cost yet provide a structure in which teeth may be replaced without replacing the entire sprocket thus reducing manufacturing cost. The sprocket comprises a pair of square plates 61 arranged face to face but rotated 45° from each other to form an eight-pointed support. On each side edge of the plates peripheral plate segments 62 having upturned end portions 63 are positioned so that sprocket teeth are formed by the end portions of adjacent segments. The entire assembly is held together by bolts 64 which secure the peripheral segments to each other and to their respective base plates. The chain links 65 are adapted to fit over sprocket teeth formed by the upturned end portions of the segments. With a sprocket thus formed, the teeth can be readily replaced without replacing the entire sprocket. In operations employing corrosive or abrasive materials this becomes very important since tooth replacement is a common occurrence.

We claim:

1. Apparatus for countercurrent soak washing of finely divided materials comprising in combination an endless conveyor means mounted for movement up an incline, a plurality of wash pans having valve means at the bottom thereof for drainage mounted on said conveyor means, feed means at the bottom of the incline for filling the pans evenly with finely divided solids, a plurality of successive applicator means arranged along said incline for successively supplying wash liquor gently onto the surface of the material in said pans by gravity flow and thereby successively filling said pans and covering said material with said wash liquor, said applicator means being located up the incline from said feed means, conduit means for accepting by gravity flow liquid drained from said pans and directing said liquid to an applicator means located at a lower elevation on said incline, first actuator means for intermittently opening and closing the pan outlet valves to limit drainage from the pans, second actuator means for said wash applicators for effecting intermittent operation to supply wash liquid intermittently to successive pans countercurrent to the movement of the pans up the incline and means for recovering wash liquor at the bottom of the incline.

2. Apparatus as recited in claim 1 wherein said conduit means comprises a stepped launder located below said wash pans, and conduits extending from said launder to said applicator means.

3. Apparatus according to claim 1, wherein said feed means includes a continuous flat surfaced conveyor belt, an open bottom feed bin located above said conveyor belt, material directing means positioned in said bin and over said conveyor in a manner to control the configuraation and depth of finely divided material on said conveyor belt, a deflection plate located at the discharge end of said conveyor belt of said feed means, said deflection plate being pivotally mounted so that its angle of deflection with respect to the upper surface of said conveyor belt can be changed, and means for automatically controlling the angle of said deflection plate responsive to the position of the pans on the incline.

4. Apparatus according to claim 3 wherein said material directing means is of a shape to control the deposit of finely divided material to form a longitudinally extending trough in the material on the belt.

5. Apparatus according to claim 1 wherein said applicator means includes a reservoir for holding liquid, flap means for maintaining liquid in said reservoir, weighted lever means for maintaining said valve in a normally closed position, spout means connected to said valve means for guiding liquid from said reservoir, rigid conduit means in communication with said spout means and adapted to be lowered to a liquid supplying position over said level surface, a lug attached to said conduit means for moving said spout means and opening said valve thereby when said conduit means is pivoted to a liquid supplying position, and automatic control means for lowering said conduit to a liquid supplying position responsive to the position of a pan in relation to said conduit and adapted to maintain a constant distance between the end of the spout and the surface of the material in the pan as the pan moves up the incline.

6. Apparatus according to claim 5 wherein said conduit means has a constriction at the liquid supplying end thereof and wherein said automatic control means is pneumatically operated.

References Cited

UNITED STATES PATENTS

| 288,259 | 11/1883 | Phelps | 23—270 |
| 2,225,799 | 12/1940 | Robinson | 23—270 |
| 2,273,126 | 2/1942 | McGillin | 23—270 X |
| 2,581,175 | 1/1952 | Calle | 23—270 X |
| 2,663,624 | 12/1953 | Hutchins | 23—270 X |
| 2,684,288 | 7/1954 | De Smet | 23—270 |
| 2,686,192 | 8/1954 | Bonotto | 23—270 X |
| 2,907,640 | 10/1959 | Konig | 23—270 |
| 3,000,391 | 9/1961 | Marshall | 23—270 X |
| 3,420,708 | 1/1969 | Schaffer | 23—270 X |

FOREIGN PATENTS

| 527,062 | 11/1920 | France. |
| 963,542 | 4/1957 | Germany. |

NORMAN YUDKOFF, Primary Examiner

S. J. EMERY, Assistant Examiner

U.S. Cl. X.R.

23—272.5, 310; 127—6; 134—48